United States Patent
Cho (10) Patent No.: US 11,616,617 B2
(45) Date of Patent: Mar. 28, 2023

(54) METHOD FOR TRANSMITTING REFERENCE SIGNAL FOR POSITIONING AND APPARATUS FOR THE SAME

(71) Applicants: Jaihyung Cho, Daejeon (KR); HyeonWoo Lee, SuWon-Shi (KR)

(72) Inventor: Jaihyung Cho, Daejeon (KR)

(73) Assignees: Jaihyung Cho, Daejeon (KR); HyeonWoo Lee, SuWon-Shi (KR)

(*) Notice: Subject to any disclaimer, the term of this patent is extended or adjusted under 35 U.S.C. 154(b) by 40 days.

(21) Appl. No.: 17/098,467

(22) Filed: Nov. 16, 2020

(65) Prior Publication Data

US 2022/0158789 A1   May 19, 2022

(51) Int. Cl.
*H04W 72/04* (2009.01)
*H04L 5/00* (2006.01)
*H04L 27/26* (2006.01)

(52) U.S. Cl.
CPC ........ *H04L 5/0048* (2013.01); *H04L 27/2605* (2013.01); *H04L 27/2628* (2013.01)

(58) Field of Classification Search
CPC .............. G01S 5/0236; H04W 64/006; H04W 72/0406; H04W 92/18; H04W 76/14; H04W 4/46; H04W 72/04; H04L 5/0048; H04L 5/0094; H04L 27/2613; H04L 5/0007; H04L 5/0051; H04L 5/00
USPC ....................................................... 370/329
See application file for complete search history.

(56) References Cited

U.S. PATENT DOCUMENTS

| | | | |
|---|---|---|---|
| 8,730,925 B2* | 5/2014 | Frank | G01S 5/0205 370/336 |
| 8,811,141 B2* | 8/2014 | Cai | H04L 27/2602 370/203 |
| 9,541,632 B2* | 1/2017 | Frank | G01S 5/0205 |
| 10,547,421 B2* | 1/2020 | Palanivelu | H04L 5/0005 |
| 10,736,113 B2* | 8/2020 | Wang | H04L 5/0048 |
| 2013/0308567 A1* | 11/2013 | Chen | H04L 27/2613 370/329 |
| 2016/0134402 A1* | 5/2016 | Park | H04L 27/2663 370/329 |
| 2017/0214508 A1* | 7/2017 | Lee | H04L 5/0035 |
| 2017/0289948 A1* | 10/2017 | Lee | H04W 24/10 |
| 2020/0267686 A1* | 8/2020 | Hunukumbure | H04W 64/003 |
| 2020/0296550 A1* | 9/2020 | Akkarakaran | G01S 5/0036 |
| 2021/0242994 A1* | 8/2021 | Bi | H04L 27/2607 |
| 2021/0321402 A1* | 10/2021 | Chen | H04W 4/025 |

* cited by examiner

*Primary Examiner* — Man U Phan
(74) *Attorney, Agent, or Firm* — Nicholas Park (57) ABSTRACT

Provided is a positioning reference signal transmission method performed by a transmitter, the method including acquiring a first time domain sample data in which a cyclic prefix (CP) insertion is completed based on a zero input; acquiring a second time domain sample data corresponding to a waveform of a signal that continues during a plurality of symbols; synthesizing the first time domain sample data and the second time domain sample data; and transmitting a positioning reference signal based on a result of synthesizing the first time domain sample data and the second time domain sample data.

10 Claims, 6 Drawing Sheets

METHOD FOR TRANSMITTING REFERENCE SIGNAL FOR POSITIONING AND APPARATUS FOR THE SAME

BACKGROUND

1. Field

The present disclosure of the following description relates to a method of transmitting a reference signal for positioning of a user equipment and a method of performing positioning using the reference signal.

2. Related Art

A communication system may include a core network (e.g., a mobility management entity (MME), a serving gateway (SGW), and a packet data network (PDN) gateway (PGW)), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

In a communication system, a UE may generally transmit and receive data through a base station. For example, if data to be transmitted to a second UE is present, a first UE may generate a message including the data to be transmitted to the second UE and may transmit the generated message to a first base station to which the first UE belongs. The first base station may receive the message from the first UE and may verify that a destination of the received message is the second UE. The first base station may transmit the message to a second base station to which the verified destination, that is, the second UE belongs in a second base station sum time interval. The second base station may receive the message from the first base station and may verify that the destination of the received message is the second UE. The second base station may transmit the message to the verified destination, that is, the second UE. The second UE may receive the message from the second base station and may acquire the data included in the received message.

A reference signal may be transmitted and received between a UE and a base station. A reference signal may be used for various purposes. For example, the UE or the base station may perform synchronization or may estimate a position of the UE using the reference signal.

A conventional reference signal may discontinue in a boundary between symbols due to a characteristic of orthogonal frequency division multiplexing (OFDM). Therefore, a UE may not readily acquire a sufficient amount of data to interpret the reference signal. In addition, if a window in which the UE performs fast Fourier transform (FFT) is out of alignment with respect to a valid period of a symbol, orthogonality of subcarriers may not be guaranteed. Alternatively, information that the UE may acquire from the reference signal may decrease.

SUMMARY

At least one example embodiment provides a method of transmitting a reference signal that may guarantee the continuity in a time interval of a size corresponding to a plurality of symbols. According to at least one example embodiment, since a user equipment (UE) may secure a sufficient amount of data for positioning from a reference signal, positioning performance may be improved.

According to an aspect, there is provided a positioning reference signal transmission method performed by a transmitter, the method including acquiring a first time domain sample data in which a cyclic prefix (CP) insertion is completed based on a zero input; acquiring a second time domain sample data corresponding to a waveform of a signal that continues during a plurality of symbols; synthesizing the first time domain sample data and the second time domain sample data; and transmitting a positioning reference signal based on a result of synthesizing the first time domain sample data and the second time domain sample data.

The positioning reference signal may have a waveform that continues during at least two symbols.

The acquiring of the first time domain sample data may include performing inverse discrete Fourier transform (IDFT) based on the zero input; performing a CP insertion based on a result of performing the IDFT; and acquiring a first time domain sample data corresponding to a waveform of a signal in which the CP insertion is completed.

Sample values included in the first time domain sample data may be equal to each other.

The acquiring of the second time domain sample data may include generating a waveform of each of subcarrier signals included in a reference signal based on a sequence defined in a time domain that includes a plurality of symbols; synthesizing subcarrier waveforms that continue during the plurality of symbols; and acquiring the second time domain sample data based on a result of synthesizing the subcarrier waveforms.

A waveform of a signal represented by the second time domain sample data may continue during the plurality of symbols.

According to another aspect, there is provided an apparatus for transmitting a reference signal, the apparatus including a communicator; and a processor configured to control the communicator. The processor is configured to perform a process of acquiring a first time domain sample data in which a cyclic prefix (CP) insertion is completed based on a zero input; a process of acquiring a second time domain sample data corresponding to a waveform of a signal that continues during a plurality of symbols; a process of synthesizing the first time domain sample data and the second time domain sample data; and a process of transmitting a positioning reference signal based on a result of synthesizing the first time domain sample data and the second time domain sample data.

The positioning reference signal may have a waveform that continues during at least two symbols.

The process of acquiring the first time domain sample data may include a process of performing IDFT based on the zero input; a process of performing a CP insertion based on a result of performing the IDFT; and a process of acquiring a first time domain sample data corresponding to a waveform of a signal in which the CP insertion is completed.

Sample values included in the first time domain sample data may be equal to each other.

The process of acquiring the second time domain sample data may include a process of generating a waveform of each of subcarrier signals included in a reference signal based on a sequence defined in a time domain that includes a plurality of symbols; a process of synthesizing subcarrier waveforms that continue during the plurality of symbols; and a process of acquiring the second time domain sample data based on a result of synthesizing the subcarrier waveforms.

A waveform of a signal represented by the second time domain sample data may continue during the plurality of symbols.

According to at least one example embodiment, an extended reference signal may have a waveform that continues during a plurality of symbols. Through this, a level of freedom that allows a UE 200 to set a fast Fourier transform (FFT) window may increase. According to at least one example embodiment, the UE 200 may easily acquire a large amount of signal analysis data while changing a position of an FFT window. According to at least one example embodiment, wireless resources required to transmit a reference signal for positioning may decrease.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

DETAILED DESCRIPTION

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first," "second," etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present. In contrast, when a component is referred to as being "directly connected to" or "directly coupled to," there is no intervening component.

The terms used herein are used to simply explain specific example embodiments and are not construed to limit the present disclosure. The singular forms "a," "an," and "the," are intended to include the plural forms as well, unless the context clearly indicates otherwise. It will be further understood that the terms "comprises/comprising (incudes/including)," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Herein, a reference signal may include, for example, a signal for positioning of a user equipment (UE), a signal for synchronization of the UE or a base station, and the like. However, it is provided as an example only. A method of estimating a reception delay time of a reference signal disclosed herein may apply to estimating a reception delay time of another signal aside from the reference signal. Here, although an example embodiment is described based on an example of estimating the reception delay time of the reference signal for clarity of description, it is provided as an example only. It should be understood that a method of estimating the reception delay time of the other signal aside from the reference signal is included in the example embodiment.

Figure 1:
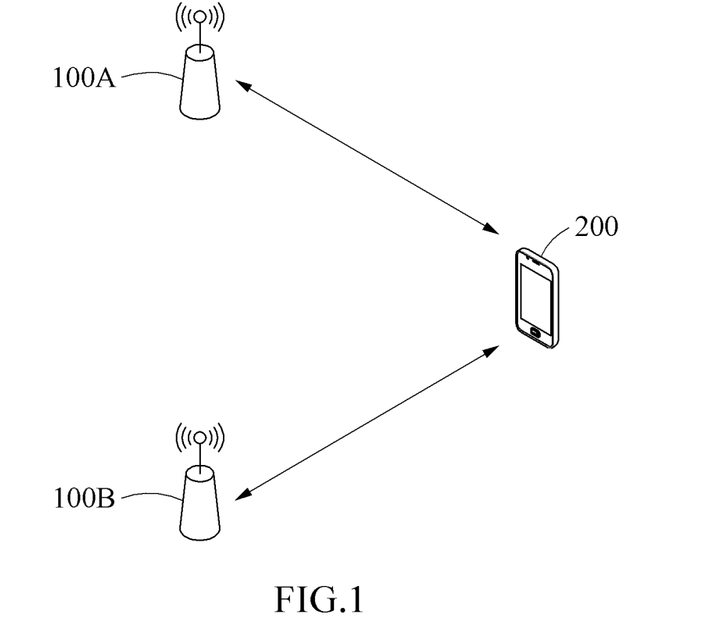
FIG. 1 illustrates an example of a communication system according to at least one example embodiment.

FIG. 1 illustrates an example of a communication system according to at least one example embodiment.

Referring to FIG. 1, the communication system may include a first base station 100A and a second base station 100B. Here, each of the first base station 100A and the second base station 100B may be referred to as, for example, NodeB, next generation NodeB, evolved NodeB, gNodeB, a base transceiver station (BTS), a radio base station, a radio transceiver, an access point, an access node, a road side unit (RSU), a radio remote head (RRH), a transmission point (TP), a transmission and reception point (TRP), a relay node, and the like. A UE 200 may also be referred to as a terminal, an access terminal, a mobile terminal, a station, a subscriber station, a mobile station, a portable subscriber station, a node, a device, and the like. The base station may be referred to as a transmitter or transceiver.

The first base station 100A may transmit a first reference signal. The second base station 100B may transmit a second reference signal. The UE 200 may receive the first reference signal and the second reference signal. The UE 200 may receive the first reference signal and the second reference signal, may calculate a phase difference or a difference in travel distance between the first reference signal and the second reference signal, and may calculate position information of the UE 200 based on the phase difference or the difference in travel distance. As another information, when the UE 200 transmits information about the phase difference or the difference in travel distance between the first reference signal and the second reference signal to the first base station 100A or the second base station 100B, the first base station 100A or the second base station 100B may also calculate position information of the UE 200.

According to an observed time difference of arrival (OT-DoA) scheme, the UE 200 may measure time difference of arrival (TDoA) between positioning reference signals (PRSs) transmitted from different base stations, for example, the first base station 100A and the second base station 100B, and may estimate a position of the UE 200. Since symbol timing is synchronized in a serving base station, for example, a serving eNB, to which the UE 200 itself belongs, the UE 200 may be unaware of an accurate start point of a symbol of a positioning reference signal (PRS) of a base station adjacent to the serving base station. The UE 200 may collect sample data corresponding to a fast Fourier transform (FFT) window and may estimate time of arrival of the PRS.

Figure 2:
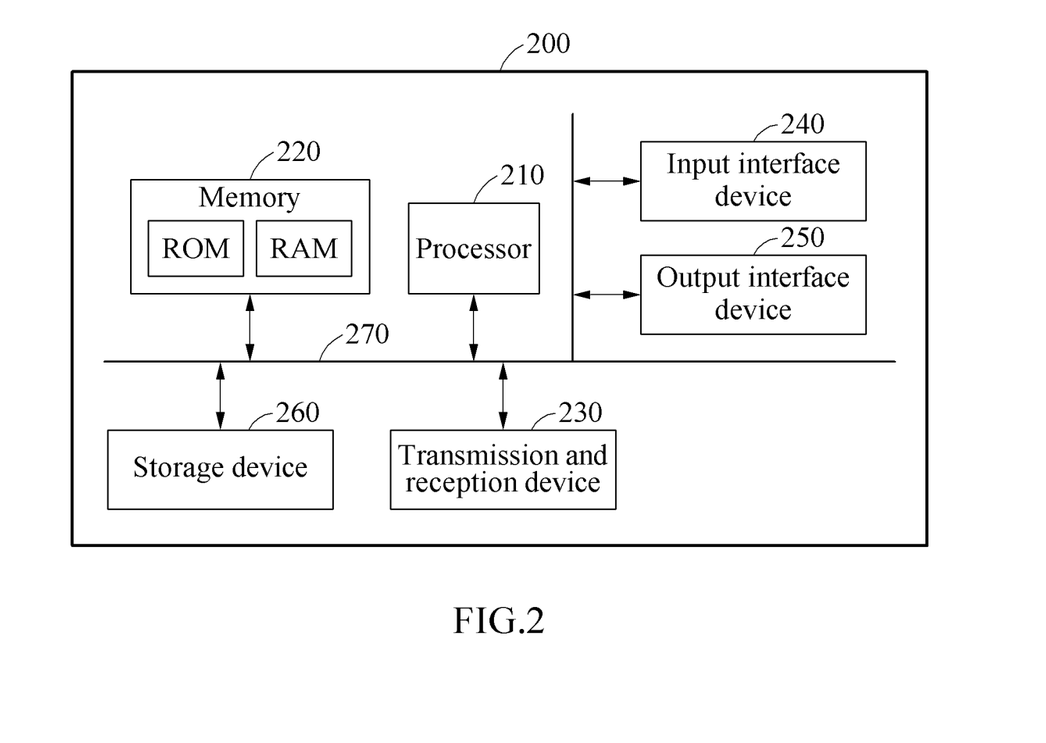
FIG. 2 is a diagram illustrating an example of a configuration of a communication node included in a communication system according to at least one example embodiment.

FIG. 2 is a diagram illustrating an example of a configuration of a communication node included in a communication system according to at least one example embodiment. Like reference numeral used for the UE 200 of FIG. 1 also applies to a reference numeral of the communication node of FIG. 2. A configuration of FIG. 2 may also apply to the first base station 100A or the second base station 100B.

Referring to FIG. 2, a communication node 200 may include at least one processor 210, a memory 220, and a transmission and reception device 230 configured to perform communication through connection to a network. Also, the communication node 200 may further include an input interface device 240, an output interface device 250, and a storage device 260. Here, the components included in the communication node 200 may communicate with each other through connection to a bus 270.

The processor 210 may execute a program command stored in at least one of the memory 220 and the storage device 260. The processor 210 may refer to a central processing unit (CPU), a graphics processing unit (GPU), or an exclusive processor that performs methods according to example embodiments. Each of the memory 220 and the storage device 260 may be configured as at least one of a volatile storage medium and a nonvolatile storage medium. For example, the memory 220 may be configured as at least one of read only memory (ROM) and random access memory (RAM).

Figure 3:
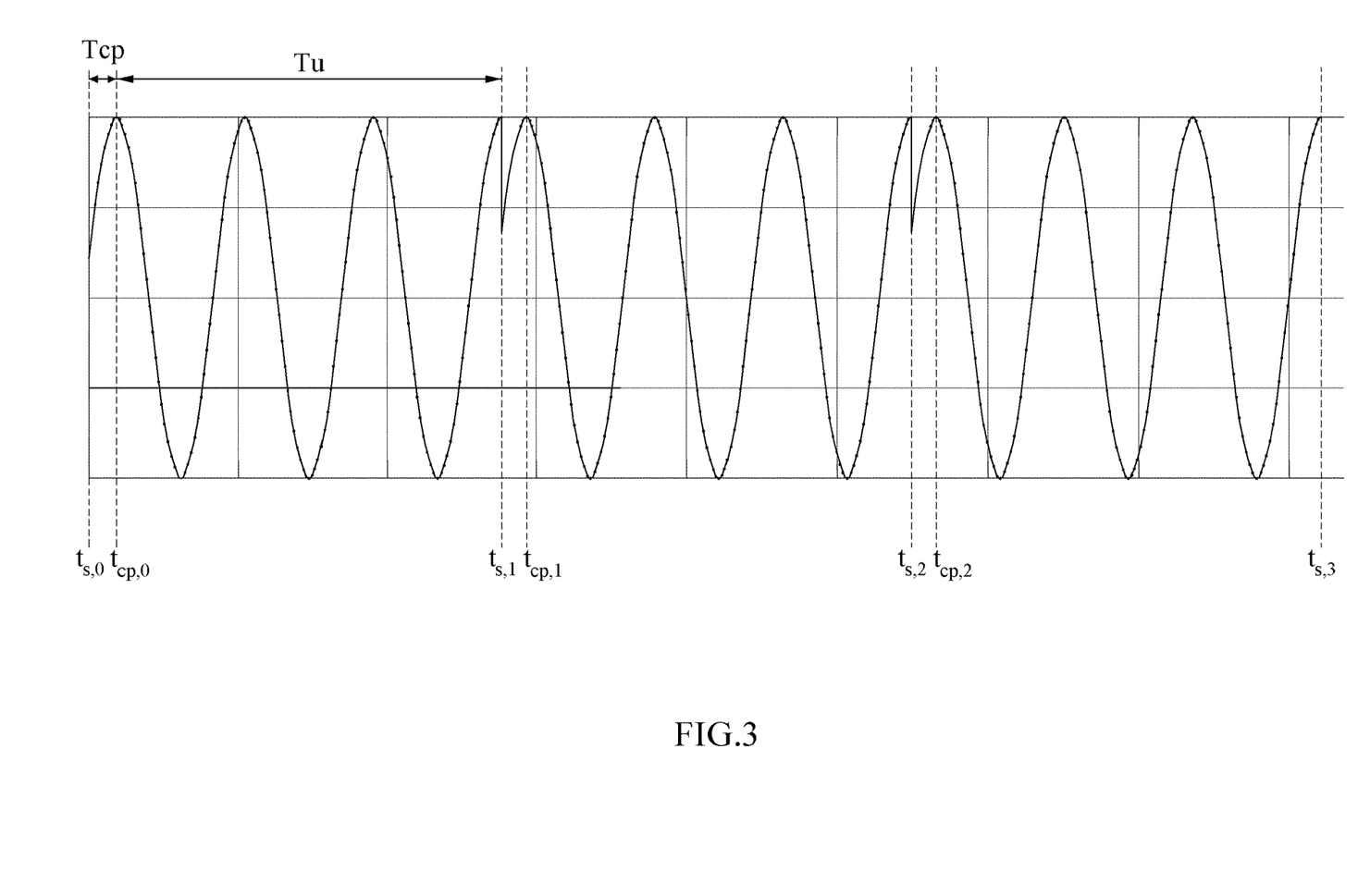
FIG. 3 illustrates an example of a subcarrier that discontinues in a boundary between orthogonal frequency division multiplexing (OFDM) symbols according to at least one example embodiment.

FIG. 3 illustrates an example of a subcarrier that discontinues in a boundary between orthogonal frequency division multiplexing (OFDM) symbols according to at least one example embodiment.

Referring to FIG. 3, each of symbols may include a cyclic prefix (CP) duration. A portion of a signal corresponding to a valid period of a symbol may be duplicated in the CP duration. Therefore, a sine wave included in a reference signal may discontinue in a boundary between symbols. Therefore, in the case of performing FFT in a plurality of symbol periods, orthogonality of sine waves may not be guaranteed. Therefore, a limiting condition may apply to the UE 200 to change a position of an FFT window. Also, if the FFT window is not present within a single symbol, the positioning performance may be degraded.

Figure 4:
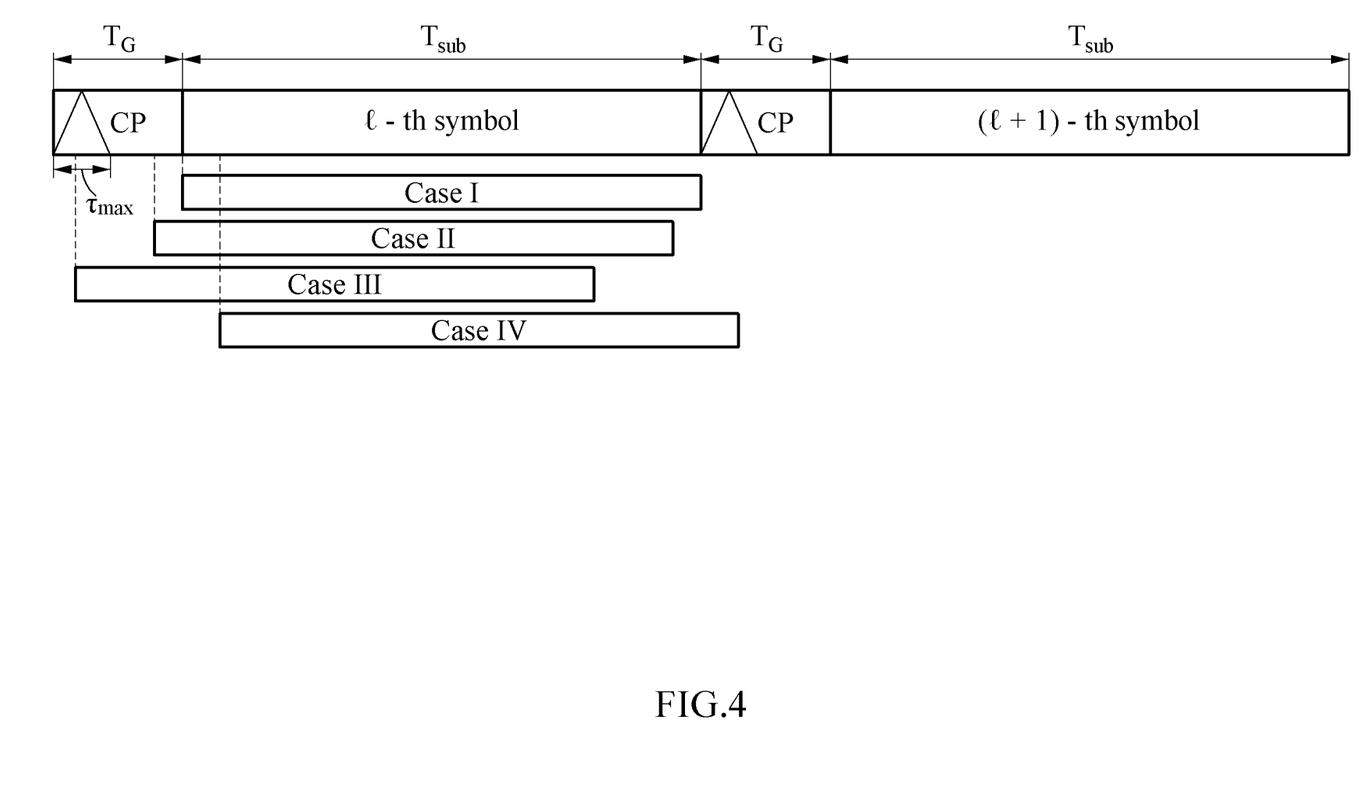
FIG. 4 illustrates an example of an alignment relationship between a symbol and a fast Fourier transform (FFT) window according to at least one example embodiment.

FIG. 4 illustrates an example of an alignment relationship between a symbol and an FFT window according to at least one example embodiment.

Referring to FIG. 4, in Case I, an FFT window and a valid period of a symbol may match. Therefore, the UE 200 may analyze a reference signal by performing FFT with respect to the valid period of the symbol. In this case, orthogonality between subcarriers may be guaranteed during an FFT performing process and the UE 200 may acquire information with relatively excellent quality.

In Case II and Case III, an FFT window and a valid period of a symbol may not match. However, the FFT window may be present within a single symbol. Also, a portion of the valid period of the symbol may be duplicated in the CP duration. Therefore, in this case, the UE 200 may relatively excellently acquire information from a reference signal. In Case IV, an FFT window may be present across two symbols. In this case, a reference signal may discontinue in a boundary between the symbols. Therefore, information that the UE 200 may acquire from the reference signal may be limited. Also, orthogonality between subcarrier signals included in the reference signal may not be guaranteed. Therefore, the signal analysis performance may be degraded.

Also, to improve the position estimation accuracy of the UE 200, a large amount of signal analysis data is required. If a reference signal discontinues in a boundary between symbols, the UE 200 needs to insert a positioning reference signal (PRS) in a large number of subcarriers across a wide bandwidth on a frequency axis or needs to transmit a repetitive signal through a plurality of consecutive symbols on a time axis. Accordingly, a large amount of wireless resources may be used.

As described above, if a reference signal discontinues in a boundary between symbols due to presence of a CP duration, the positioning performance may be degraded or wireless resources required for reference signal transmission may be excessively used. Hereinafter, a method of transmitting a reference signal to outperform the aforementioned issue is described.

Figure 5:
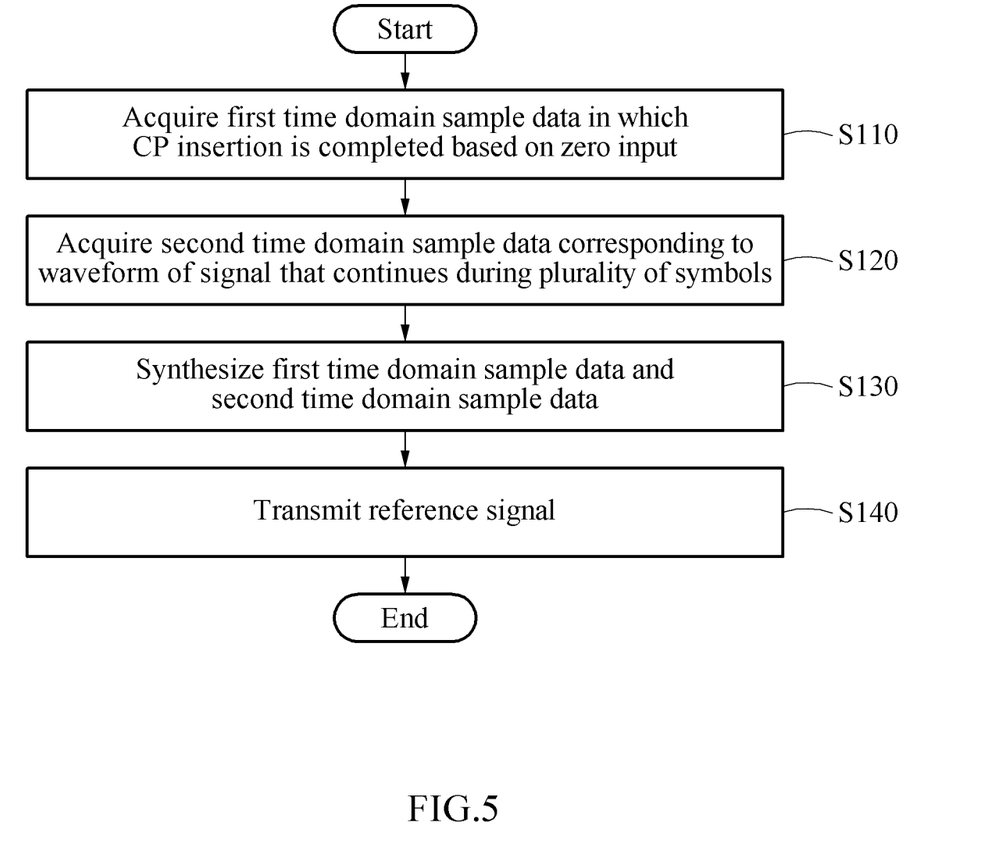
FIG. 5 is a flowchart illustrating a method of transmitting a reference signal according to at least one example embodiment.
Figure 6:
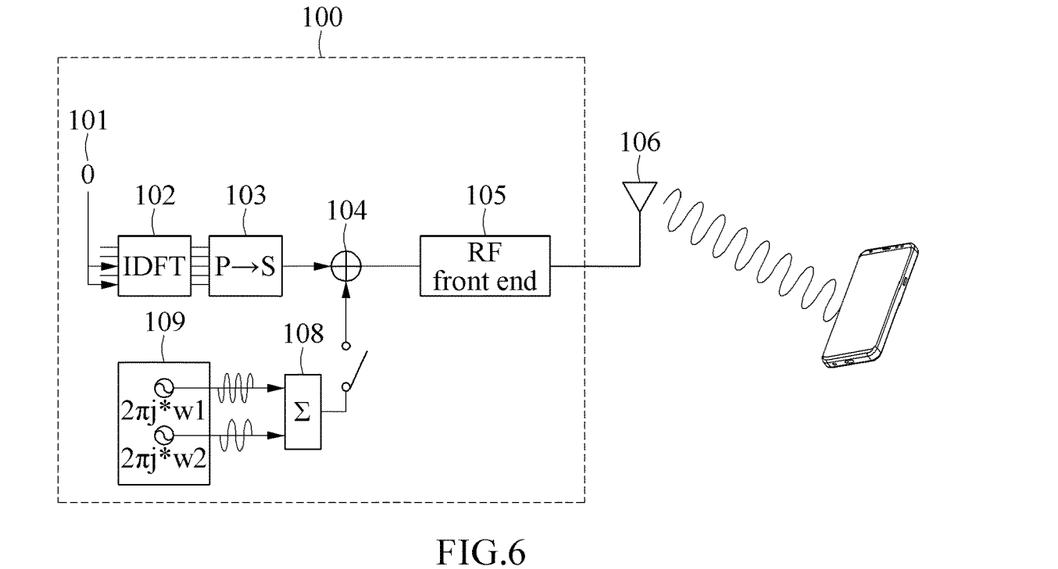
FIG. 6 illustrates an example of a configuration of a first base station 100A or a second base station 100B configured to perform the method of FIG. 5 using a functional unit according to at least one example embodiment.

FIG. 5 is a flowchart illustrating a method of transmitting a reference signal according to at least one example embodiment. The method of FIG. 5 may be performed by the first base station 100A or the second base station 100B of FIG. 1. FIG. 6 illustrates an example of a configuration of the first base station 100A or the second base station 100B configured to perform the method of FIG. 5 using a functional unit according to at least one example embodiment. Blocks of FIG. 6 are merely classified for clarity of description and thus, should not be construed as being strictly separated logically or physically from each other. For clarity of description, the following description is made based on an example in which the first base station 100A is an entity that implements the method of FIG. 5.

Referring to FIGS. 5 and 6, in operation S110, the first base station 100A may acquire a first time domain sample data of a signal in which a CP insertion is completed based on a zero input. In general, if the first base station 100A performs IDFT and inserts a CP by inputting data to a subcarrier, a signal may discontinue in a boundary between symbols.

Therefore, a signal inputter 101 of the first base station 100A may not input data or may input a value of "0" to a subcarrier allocated for reference signal transmission in a time interval for transmitting a reference signal for positioning. That is, the zero input may include not inputting data or may include inputting the value of "0" to the subcarrier. The time interval for transmitting a reference signal may include at least two symbols. An IDFT calculator 102 of the first base station 100A may perform an IDFT operation based on the zero input acquired from the signal inputter 101. A CP processing 103 of the first base station 100A may perform a CP operation of duplicating a portion of a last part of a valid period of a symbol and attaching the duplicated portion to the front of a valid period of a symbol in a sample sequence that is acquired by converting a result output from the IDFT calculator 102 to a time domain. Since the signal inputter 101 does not input data or inputs only the value of "0" to the subcarrier, a value of the first time domain sample data output from the CP processing 103 may be fixed to 0 or constant. Therefore, a waveform of a signal represented by the first time domain sample data output from the CP processing 103 may continue in a boundary between symbols.

In operation S120, a waveform generator 109 may generate subcarrier waveforms that continue in a plurality of symbols. A signal sequence for generating a sine wave in general OFDM may be represented as the following Equation 1.

$$x_l[n] = \sum_{k=0}^{N-1} X_l[k]e^{j2\pi kn/N}, \quad \text{[Equation 1]}$$

$$n = 0, 1, 2, 3, \ldots, N-1$$

In Equation 1, N denotes a total number of subcarriers and it corresponds to denotes a number of time samples included in a valid period of a single symbol. $X_l[k]$ denotes a complex exponentiation representing an initial phase and amplitude of a k-subcarrier of an l-th symbol, and n denotes a sequence number of a time domain sample data sequence. In general, n denotes a value between 0 and N−1 within a valid period of a single symbol.

In the case of using the sequence represented as Equation 1, the time domain sample data sequence may be defined only within a valid period of a single symbol. The waveform generator 109 may generate a waveform that continues in a plurality of symbols by extending a time domain of Equation 1 to a plurality of symbol periods. For example, the waveform generator 109 may generate a waveform of a reference signal that continues in the plurality of symbols according to Equation 2. The reference signal that continues in the plurality of symbols may also be referred to as an extended reference signal.

$$x_l[n] = \sum_{k=0}^{N-1} X_l[k]e^{j2\pi kn/N}, \quad \text{[Equation 2]}$$

$$n = 0, 1, 2, 3, \ldots, (N+s)p - 1$$

In Equation 2, s denotes a size of a CP duration, that is, a number of time samples included in a single CP and p denotes a number of symbols included in a time interval in which the extended reference signal continues. Remaining notations of Equation 2 are identical to those of Equation 2 and thus, further description related thereto is omitted.

In Equation 1, a time domain of a sequence of a reference signal may correspond to a valid period of a single symbol. In contrast, referring to Equation 2, a time domain of a sequence of an extended reference signal may be extended to a plurality of symbols, for example, p symbols. The waveform generator 109 may generate a waveform for each subcarrier and may input the generated waveform to a second time domain sample data generator 108. The second time domain sample data generator 108 may synthesize waveforms generated for the respective subcarriers and may store time domain sample data values of the synthesized waveforms. For example, referring to Equation 2, if an index n of a time domain has a value between 0 and (N+s)p−1, the second time domain sample data generator 108 may store (N+s)p time domain sample data values. Here, N denotes a number of time samples included in a valid period of a single symbol and s denotes a number of time samples included in a single CP.

In operation S130, a signal synthesizer 104 may synthesize a first time domain sample data output from the CP processing 103 and a second time domain sample data output from the second time domain sample data generator 108. For example, the signal synthesizer 104 may sum up a first time domain sample data sequence output from the CP processing 103 and a second time domain sample data sequence output from the second time domain sample data generator 108. A signal synthesis process of the signal synthesizer 104 may be performed after the CP insertion is completed. Also, as described above, all of a waveform represented by the first time domain sample data and a waveform represented by the second time domain sample data may continue during a plurality of symbols. Therefore, a waveform of a signal synthesized by the signal synthesizer 104 may be maintained to continue during the plurality of symbols.

In operation S140, data of the signal synthesized by the signal synthesizer 104 may be input to an RF front end 105. The RF front end 105 may receive a result of synthesizing the first time domain sample data and the second time domain sample data through the signal synthesizer 104 and may transmit an extended reference signal having a waveform that continues during the plurality of symbols through an antenna 106.

Figure 7:
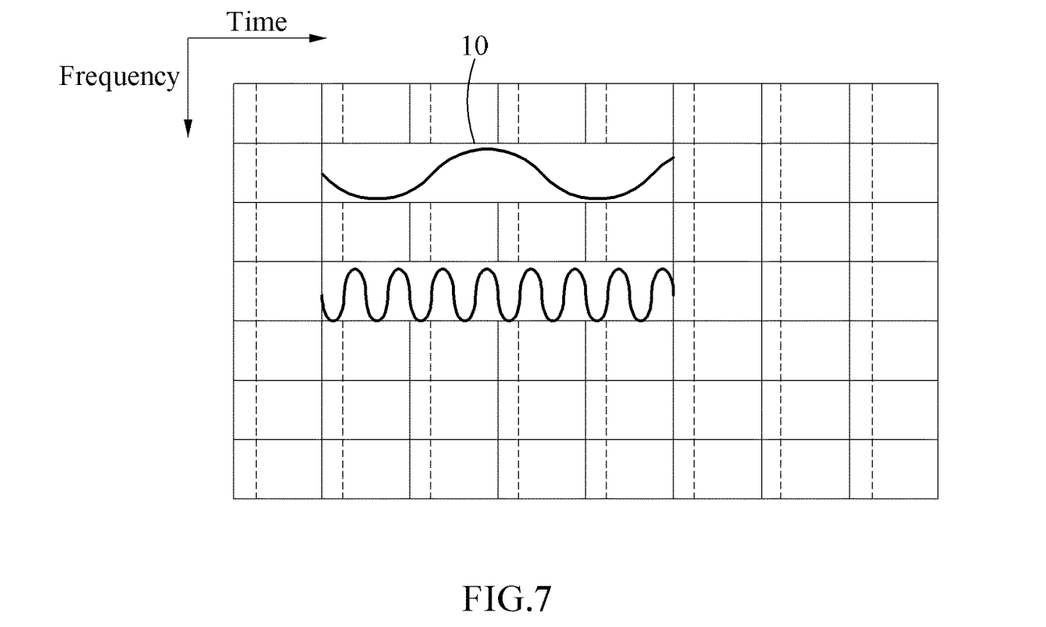
FIG. 7 illustrates an example of an extended reference signal on an OFDM resource block according to at least one example embodiment.

FIG. 7 illustrates an example of an extended reference signal on an OFDM resource block according to at least one example embodiment.

In FIG. 7, a dotted line represents a boundary between a CP within a symbol and a valid period of a symbol and a solid line represents a boundary between resource elements. Referring to FIG. 7, an extended reference signal 10 may have a continuous waveform during 4 symbols. In this case, in Equation 2, a value of p may be set to 4. Since first time sample data and second time sample data are synthesized after CP processing is completed, the continuity of the extended reference signal 10 may be guaranteed in a boundary between symbols.

Since the continuity of the extended reference signal is guaranteed during the plurality of symbols, the UE 200 may be allowed to set the FFT window as shown in Case IV without being limited to Case 1 to Case III of FIG. 4. Therefore, a level of freedom that allows the UE 200 to set the FFT window may increase. Also, the UE 200 may easily acquire a large amount of signal analysis data while changing a position of the FFT window. Also, wireless resources required to transmit a reference signal for positioning may decrease.

Figure 8:
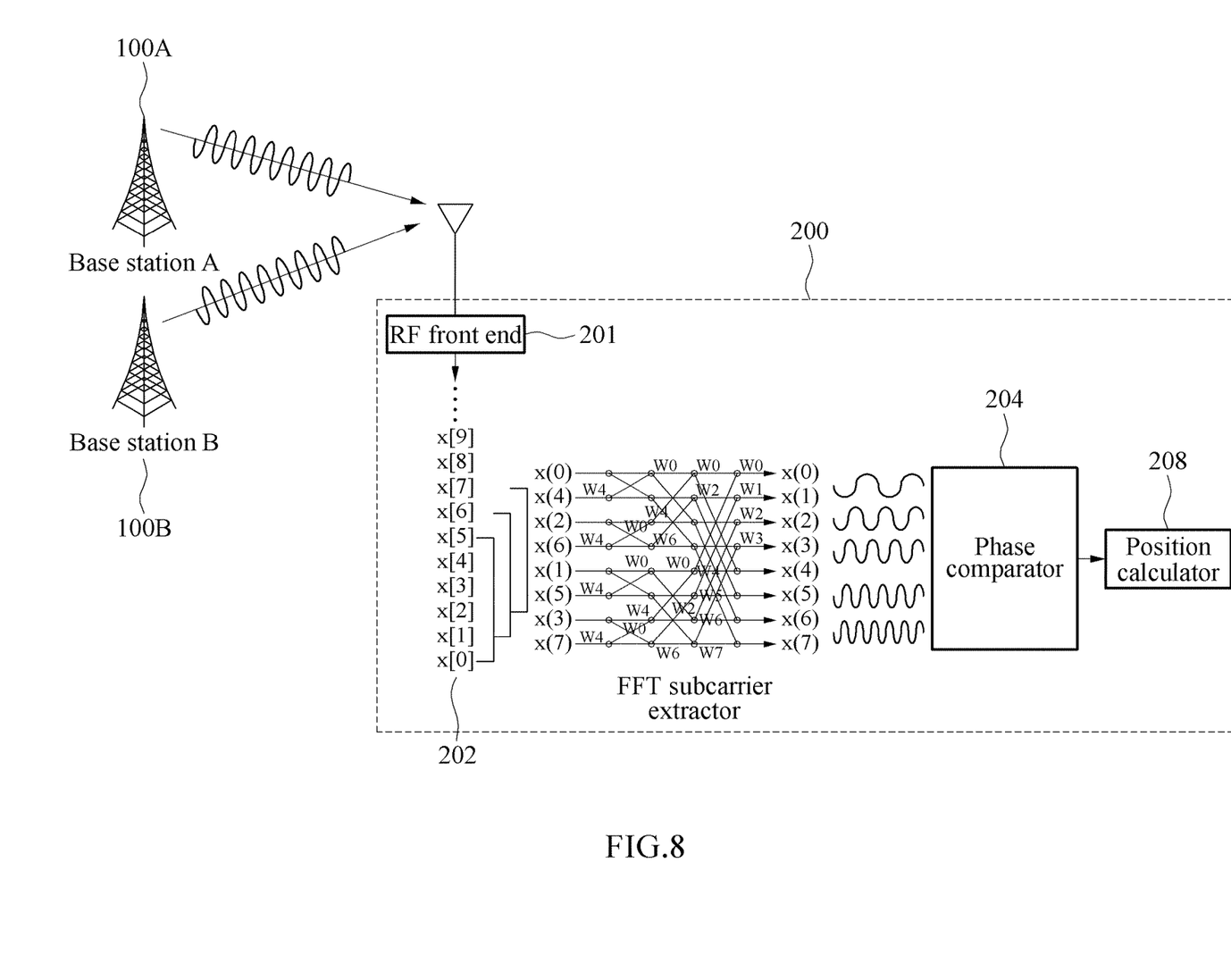
FIG. 8 illustrates an example of a configuration of a user equipment (UE) 200 configured to receive an extended reference signal using a functional unit according to at least one example embodiment.

FIG. 8 illustrates an example of a configuration of the UE 200 configured to receive an extended reference signal using a functional unit according to at least one example embodiment. Similar to FIG. 6, blocks of FIG. 8 are merely classified for clarity of description and thus, should not be construed as being strictly separated logically or physically from each other.

Referring to FIG. 8, the UE 200 may receive a first extended reference signal from the first base station 100A and may receive a second extended reference signal from the second base station 100B. Each of the first base station 100A and the second base station 100B may transmit an extended reference signal using a different subcarrier group. If the first base station 100A and the second base station 100B is not completely synchronized, a point in time at which the first base station 100A transmits the first extended reference signal and a point in time at which the second base station 100B transmits the second extended reference signal may differ from each other.

The UE 200 may receive the first extended reference signal and the second extended reference signal. The UE 200 may be time-synchronized with one of the first base station 100A and the second base station 100B. As another example, the UE 200 may be time-synchronized with another base station aside from the first base station 100A and the second base station 100B.

The UE 200 may extract a time interval in which all of the first extended reference signal and the second extended reference signal are received as a continuous waveform. Since each of the first extended reference signal and the second extended reference signal continues during a plurality of symbols, the UE 200 may easily find the time interval in which all of the first extended reference signal and the second extended reference signal are received as the continuous waveform although a reception time of the first extended reference signal and a reception time of the second extended reference signal differ from each other. Also, the UE 200 may set an FFT window in the corresponding time interval and may perform an FFT operation.

Since a subcarrier included in the first extended reference signal and a subcarrier included in the second extended reference signal differ from each other, the UE 200 may separate and analyze the first extended reference signal and the second extended reference signal through the FFT operation. An RF front end 201 may separate the first extended reference signal and the second extended reference signal by performing the FFT operation. The RF front end 201 may acquire signal samples 202 at N sample times.

The UE 200 may extract a first sample vector corresponding to the first extended reference signal and a second sample vector corresponding to the second extended reference signal using the signal samples 202 acquired at the N sample times.

A phase comparator 204 may calculate a phase difference between the first extended reference signal and the second extended reference signal. For example, the phase comparator 204 may acquire information about the phase difference using a conjugate multiplication of a first phase vector calculated from the first sample vector and a second phase vector calculated from the second sample vector. The position calculator 208 may calculate a position of the UE 200 based on information about the phase difference between the first extended reference signal and the second extended reference signal. For example, the position calculator 208 may calculate a difference between a distance from the first base station 100A to the UE 200 and a distance from the second base station 100B to the UE 200. The position calculator 208 may calculate position coordinates of the UE 200 based on the difference in distance.

The RF front end 201 of the UE may secure a sufficient amount of sample data while changing a position of the FFT window. As described above, since all of the first extended reference signal and the second extended reference signal continue in the plurality of symbols, the UE 200 may acquire the signal samples 202 while changing a position of the FFT window at a relatively high level of freedom. For example, if a signal sample acquired by the UE 200 from a first FFT window includes x[0] to x[N−1], the UE 200 may acquire a signal sample including x[1] to x[N] from a second FFT window by shifting the FFT window based on a sample time unit. In this manner, the UE 200 may secure a sufficient amount of signal analysis data and a partially overlapping operation process may be omitted from a signal analysis process, which may lead to improving the operation efficiency.

A method and apparatus for transmitting a reference signal for positioning according to example embodiments is described with reference to FIGS. 1 to 8. Also, a positioning method and apparatus using a reference signal according to example embodiments is described. According to at least one example embodiment, an extended reference signal may have a continuous waveform during a plurality of symbols. Through this, a level of freedom that allows the UE 200 to set an FFT window may increase. According to at least one example embodiment, the UE 200 may easily acquire a large amount of signal analysis data while changing a position of an FFT window. According to at least one example embodiment, wireless resources required to transmit a reference signal for positioning may decrease.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processors having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, or, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A positioning reference signal transmission method performed by a transmitter, the method comprising:
   acquiring a first time domain sample data in which a cyclic prefix (CP) insertion is completed based on a zero input;
   acquiring a second time domain sample data having a waveform of a signal that continues during a plurality of symbols;
   synthesizing the first time domain sample data and the second time domain sample data; and
   transmitting a positioning reference signal based on a result of synthesizing the first time domain sample data and the second time domain sample data,
   wherein the acquiring of the second time domain sample data comprises:
   generating a waveform of each of subcarrier signals included in a reference signal based on a sequence defined in a time domain that includes a plurality of symbols;
   synthesizing subcarrier waveforms that continue during the plurality of symbols; and
   acquiring the second time domain sample data based on a result of synthesizing the subcarrier waveforms.

2. The method of claim 1, wherein the positioning reference signal has a waveform that continues during at least two symbols.

3. The method of claim 1, wherein the acquiring of the first time domain sample data comprises:

performing inverse discrete Fourier transform (IDFT) based on the zero input;

performing a CP insertion based on a result of performing the IDFT; and acquiring a first time domain sample data corresponding to a waveform of a signal in which the CP insertion is completed.

4. The method of claim 3, wherein sample values included in the first time domain sample data are equal to each other.

5. The method of claim 1, wherein a waveform of a signal represented by the second time domain sample data continues during the plurality of symbols.

6. An apparatus for transmitting a reference signal, the apparatus comprising:

a communicator; and a processor controlling the communicator, wherein the processor performs a process of acquiring a first time domain sample data in which a cyclic prefix (CP) insertion is completed based on a zero input; a process of acquiring a second time domain sample data having a waveform of a signal that continues during a plurality of symbols; a process of synthesizing the first time domain sample data and the second time domain sample data; and a process of transmitting a positioning reference signal based on a result of synthesizing the first time domain sample data and the second time domain sample data, wherein the process of acquiring the second time domain sample data comprises:

a process of generating a waveform of each of subcarrier signals included in a reference signal based on a sequence defined in a time domain that includes a plurality of symbols;

a process of synthesizing subcarrier waveforms that continue during the plurality of symbols; and a process of acquiring the second time domain sample data based on a result of synthesizing the subcarrier waveforms.

7. The apparatus of claim 6, wherein the positioning reference signal has a waveform that continues during at least two symbols.

8. The apparatus of claim 6, wherein the process of acquiring the first time domain sample data comprises:

a process of performing inverse discrete Fourier transform (IDFT) based on the zero input;

a process of performing a CP insertion based on a result of performing the IDFT; and a process of acquiring a first time domain sample data corresponding to a waveform of a signal in which the CP insertion is completed.

9. The apparatus of claim 8, wherein sample values included in the first time domain sample data are equal to each other.

10. The apparatus of claim 6, wherein a waveform of a signal represented by the second time domain sample data continues during the plurality of symbols.

* * * * *